(12) United States Patent (10) Patent No.: US 8,475,143 B1
Hershberger (45) Date of Patent: Jul. 2, 2013

(54) WIND DRIVEN MACHINE

(75) Inventor: Roy J. Hershberger, Seymour, IA (US)

(73) Assignee: Hershberger Wind Energy, LLC, Seymour, IA (US)

( * ) Notice: Subject to any disclaimer, the term of this patent is extended or adjusted under 35 U.S.C. 154(b) by 255 days.

(21) Appl. No.: 13/036,766

(22) Filed: Feb. 28, 2011

Related U.S. Application Data

(60) Provisional application No. 61/310,042, filed on Mar. 3, 2010.

(51) Int. Cl.
*F04B 17/02* (2006.01)

(52) U.S. Cl.
USPC .......................................... 417/336

(58) Field of Classification Search
USPC ... 417/1, 15, 35, 307, 334, 335, 336; 416/142
See application file for complete search history.

(56) References Cited

U.S. PATENT DOCUMENTS

| | | | |
|---|---|---|---|
| 459,982 A * | 9/1891 | Wilson | 417/35 |
| 666,993 A * | 1/1901 | Young | 417/35 |
| 903,372 A * | 11/1908 | Gardner | 417/1 |
| 1,158,393 A * | 10/1915 | Sippert | 417/35 |
| 1,211,161 A * | 1/1917 | Jikihara | 417/1 |
| 1,675,159 A | 6/1928 | Burch | |
| 2,026,828 A | 1/1936 | Dunn | |
| 2,055,012 A | 9/1936 | Jacobs | |
| 2,140,152 A | 12/1938 | Dunn | |
| 2,207,964 A | 7/1940 | Albers | |
| 2,245,264 A | 6/1941 | Dunn | |
| 2,376,020 A * | 5/1945 | Victoria | 290/44 |
| 2,539,862 A | 1/1951 | Rushing | |
| 2,628,564 A | 2/1953 | Jacobs | |
| 4,008,006 A | 2/1977 | Bea | |
| 4,358,250 A | 11/1982 | Payne | |
| 4,447,738 A | 5/1984 | Allison | |
| 4,648,801 A | 3/1987 | Wilson | |
| 4,767,939 A | 8/1988 | Calley | |

* cited by examiner

*Primary Examiner* — Devon Kramer
*Assistant Examiner* — Bryan Lettman
(74) *Attorney, Agent, or Firm* — Jason R. Sytsma; Shuttleworth & Ingersoll, PLC

(57) ABSTRACT

A wind driven machine with a furling system to move the machine to between an active position and an inactive position in response to a predetermined condition. The wind driven machine includes a propeller section and a tail section, the tail section hinged to the propeller section to direct the propeller section into the wind. The furling system includes a first portion to rotate with one of the respective sections and a second portion that is generally rotationally fixed and moves axially between an active position and an inactive position corresponding to the active and inactive positions of the wind driven machine.

25 Claims, 10 Drawing Sheets

WIND DRIVEN MACHINE

The present application claims priority under 35 USC §119 to U.S. provisional patent application 61/310,042 filed Mar. 3, 2010, the contents of which are incorporated herein by reference.

BACKGROUND

This invention relates to wind driven power devices and compressors and in particular to a mechanically automated and operated wind driven power device, compressor and compressed air storage apparatus.

The invention is intended to exploit the fact that, because air is compressible the energy therein can be stored and released in a controlled manner. This is of particular significance for wind-energized apparatus since, as is commonly known, there is a considerable and continuous variation in the strength at which the wind blows.

A need has long existed for an inexpensive power system that is easy to maintain and practical to provide utility independence for the homeowner or small user. Known windmill systems provide a degree of independence but require constant attention to furl the windmill out of the wind in high wind speed conditions or move the windmill to an inactive mode of operation when the storage cylinder has reached its capacity.

SUMMARY

According to the present invention, there is provided a wind driven machine with a furling system to move the machine to between an active position and an inactive position in response to a predetermined condition. The wind driven machine includes a propeller section and a tail section, the tail section hinged to the propeller section to direct the propeller section into the wind. The furling system includes a first portion to rotate with one of the respective sections and a second portion that is generally rotationally fixed and moves axially between an active position and an inactive position corresponding to the active and inactive positions of the wind driven machine A machine is provided that is selectively engageable with the propeller section for using the rotational motion of the propeller section to do at least one of the following pressurize gas, pressurize fluid, and generate electricity. An energy reservoir is provided for storing at least one of the following pressurized gas, pressurized fluid, and electrical charge derived from the machine, the energy reservoir includes a sensor for sensing a predetermined threshold in the energy reservoir. In response to sensing the predetermined threshold, an actuator actuates to moves one of the propeller section and the tail section to the inactive position.

In a further embodiment, a biasing member is positioned between the respective sections to urge one of the respective sections toward the inactive position when the wind speed increases beyond a predetermined threshold.

In another embodiment, there is provided an automated furling system for a wind driven compressor. A linkage system extends between an actuator and one of the propeller section and the tail section to move one of the respective sections between an active position where the compressor is compressing and an inactive position where the compressor is inactive. The linkage system has a first portion that moves axially between the active and the inactive position to furl one of the respective section to the inactive position. The linkage system further includes a second portion that rotates with one of the respective sections around an axis of a channel that provides for the fluid communication between the air compressor and a storage tank to maintain an alignment of the linkage system.

BRIEF DESCRIPTION OF THE FIGURES

For a more complete understanding of particular embodiments and their features and advantages, reference is now made to the following description, taken in conjunction with the accompanying drawings, in which.

DETAILED DESCRIPTION

Figure 1:
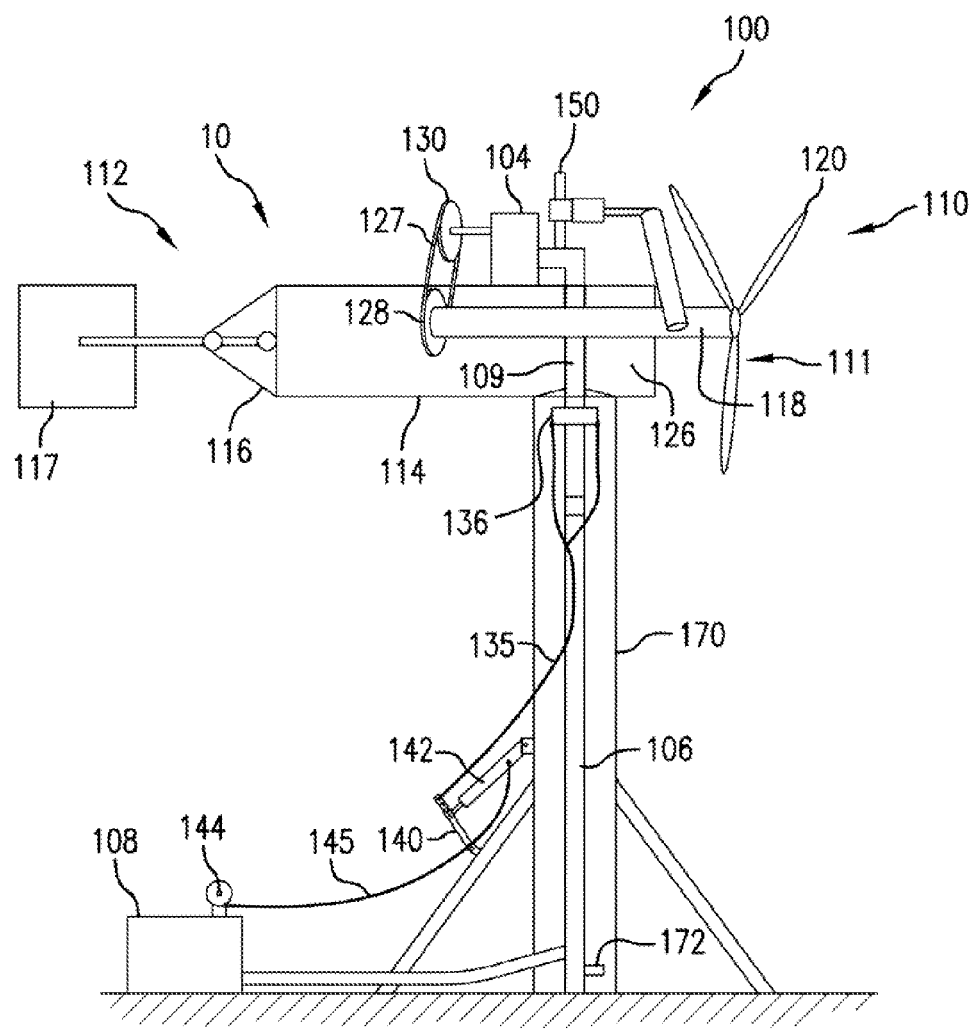
FIG. 1 is a perspective view of a windmill and wind driven compressor of in an active position.

In the embodiment of FIG. 1, the present invention, using solely mechanical devices, converts wind energy into useable kinetic energy in a form of compressed air for pneumatic applications. A wind driven compressor 100 generally comprises a windmill 10 to drive an air compressor 104. A conduit 106 directs compressed air from compressor 104 to a storage tank 108 for pneumatic applications.

Windmill 10 has a propeller section 110 hinged to a tail section 112 for furling one of the respective sections 110 and 112 out of the wind. Tail section 112 has a forward portion 114 hinged to propeller section 110 and a rearward portion 116 welded thereto and extending downwind. Rearward portion 116 has a pair of aligned sleeves 116a welded on its side for receiving a fin portion 117, which extends downwind to guide windmill 10 into the wind.

Propeller section 110 of windmill 10 includes at least one propeller 111 having two or more propeller blades 120 mounted equidistant apart on a rotating shaft 118. Here, three propeller blades 120 are shown. Propeller blades 120 are formed in a conventional manner and can be made from fiberglass composite and formed in an appropriate aerodynamic configuration to provide an efficient transfer of power from the wind to propeller 111. In one configuration, propeller blades 120 can be mounted on blade extensions 120a to increase propeller 111 diameter. Blade extensions 120a are made from flat sheets of steel formed with appropriate aerodynamic curvatures to maximize start-up torque. Blade extensions 120a are stabilized with respect to each other and held squarely into the wind by propeller cross bars 124 extending between blade extensions 120a.

Rotating shaft 118 is connected to propeller 111 and extends the length of propeller section 110 to drive an air compressor 104 and a centrifugal switch 152 (discussed below). Air compressor 104 is mounted on a frame 126 of propeller section 110. A first pulley 128 is mounted toward the end of rotating shaft 118 opposite of propeller 111. A belt 127 extends between first pulley 128 and a corresponding pulley 130 on compressor 128 so that the propeller 111 can drive the compressor 104. Compressor 104 is a typical compressor that converts rotary mechanical motion into compressed air, can be driven by a belt and is generally known to persons skilled in the art.

Compressor 104 has an RPM range at which it operates at maximum efficiency. When the wind speed increases, so does the RPM of rotating shaft 118, which in turn increases the RPM of compressor 104. When the wind speed rises above a desired level, the ability to furl propeller section 110 of windmill 10 can help maintain a more consistent RPM of shaft 118 and compressor 104, and maintain the operation of compressor 104 in its range of maximum efficiency. That is, by angling propeller section 110 away from a directly head-on orientation with respect to the wind direction, the wind vector parallel to an axis of rotation of propeller 111 is decreased, which in turn decreases the RPM of rotating shaft 118 and thus reduces the RPM of compressor 104.

Figure 2A:
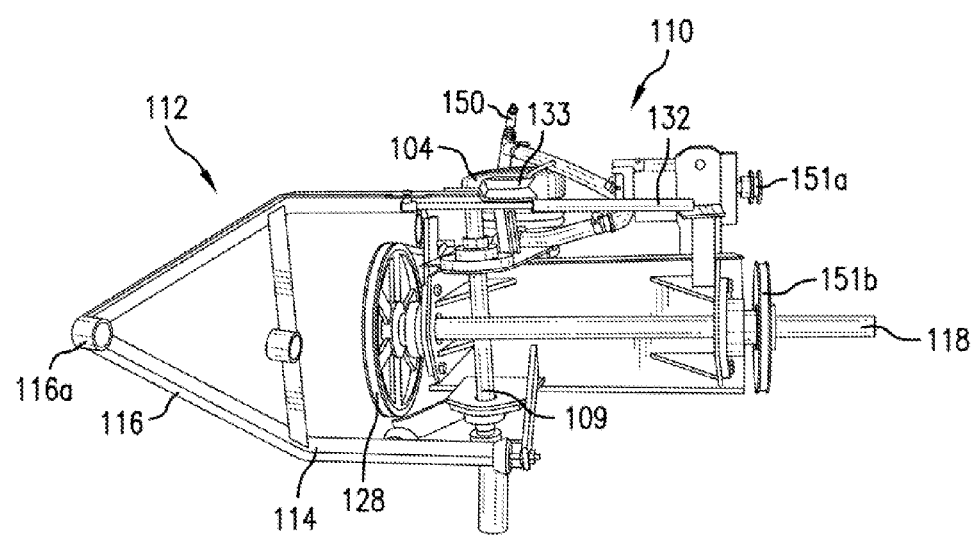
FIG. 2A is a perspective view of the wind driven compressor of FIG. 1A in the active position.
Figure 2B:
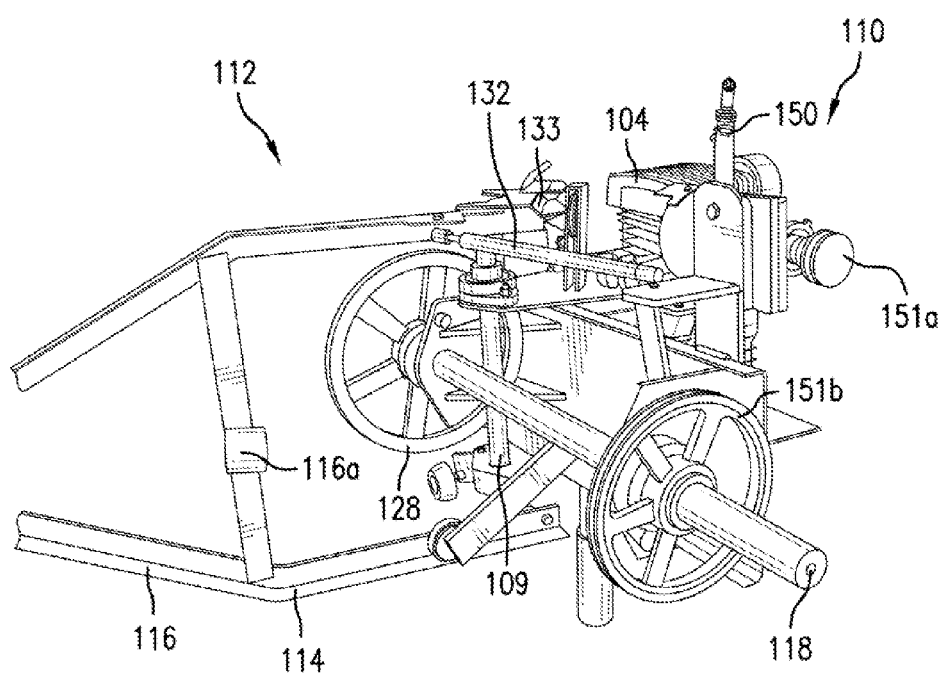
FIG. 2B is a perspective view of the wind driven compressor of FIG. 1A in the inactive position.

FIGS. 2A and 2B show propeller section 110 and tail section 112 pivotally joined together by a hinge 109. A biasing member 132 is connected between the propeller section 110 and the tail section 112 to provide a biasing force between the two hinged sections 110 and 112. In the illustrated embodiment, biasing member 132 is an adjustable compressed gas cartridge that exerts a biasing force between propeller section 110 and tail section 112 to bias propeller section 110 toward an active position of direct alignment with tail section 112. Other types of biasing mechanisms can also be used.

Biasing member 132 operates in two manners. First, by adjusting the biasing force biasing member 132 exerts between propeller section 110 and tail section 112, biasing member 132 can act as an automatic regulator of RPM of propeller 111 and thus compressor 104. That is, force from the wind acting against propeller 111 creates a force acting to pivot the propeller section 110 toward tail section 112, counter to the "straightening" force exerted by the biasing member 132. Such pivoting force acts to pivot propeller section 110 out of direct head-on orientation with the wind and reduces the force of the wind on propeller 111. The wind speed at which it is desired for the automatic regulation of the propeller 111 can be adjusted upward or downward by likewise adjusting the biasing force exerted by biasing member 132. As the wind speed decreases, the biasing force from biasing member 132 will again overcome the pivoting force of the wind and urge propeller section 110 back toward the active position aligned with tail section 112 head-on into the wind. In the preferred embodiment, the desired RPM of propeller 111 is approximately 300 rpm, which corresponds to a wind speed of approximately 15-20 mph and the biasing force exerted by the biasing member 132 is set to begin to move propeller section 110 out of the wind as the wind speed exceeds this range.

It is also desirable to furl propeller section 110 of windmill 10 out of the wind when storage tank 108 has reached its capacity. FIG. 2B shows propeller section 110 furled to an inactive position away from head-on to the wind. FIGS. 2C, 2D 3A, 3B, and 4 show a secondary furling system for rotating propeller section 110 to the inactive position. As previously stated, propeller section 110 and tail section 112 are pivotally joined together by hinge 109. The respective sections 110 and 112 can pivot with respect to each other, which allows propeller section 110 to move between an active position where an axis of rotation for propeller 111 is generally aligned with tail section 112, and oriented head-on into the wind, and the inactive position where the axis of rotation for propellers 120 is angled toward a position perpendicular to tail section 112 and the direction of the wind. In the active position, wind driven compressor 100 is in an active mode of operation. In the inactive position, wind driven compressor 100 is in an inactive mode of operation.

Figure 2C:
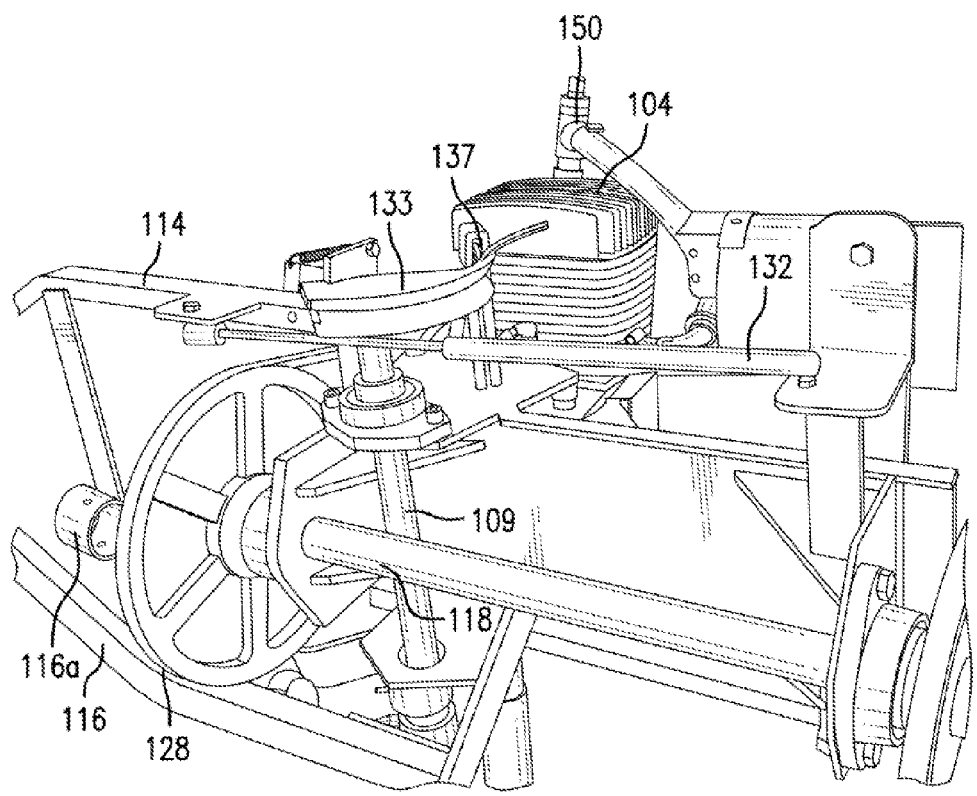
FIG. 2C is a perspective side view of the wind driven compressor of FIG. 1A in the active position.
Figure 2D:
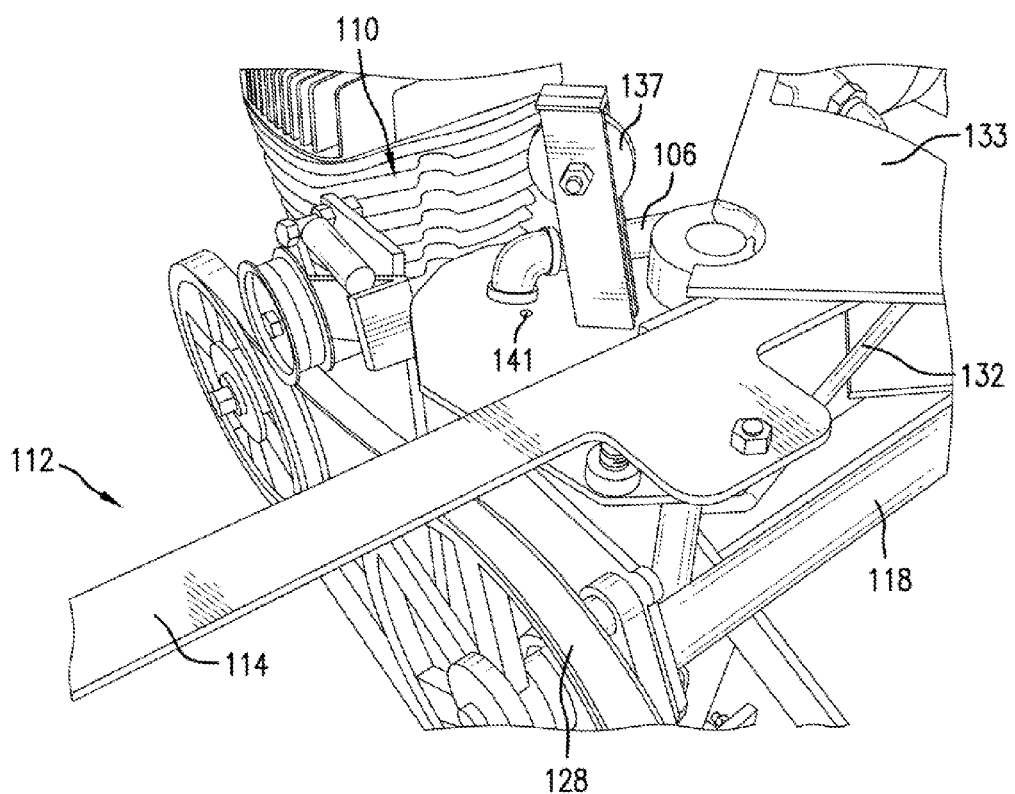
FIG. 2D is a top perspective view of the wind driven compressor of FIG. 1A in the active position.
Figure 3A:
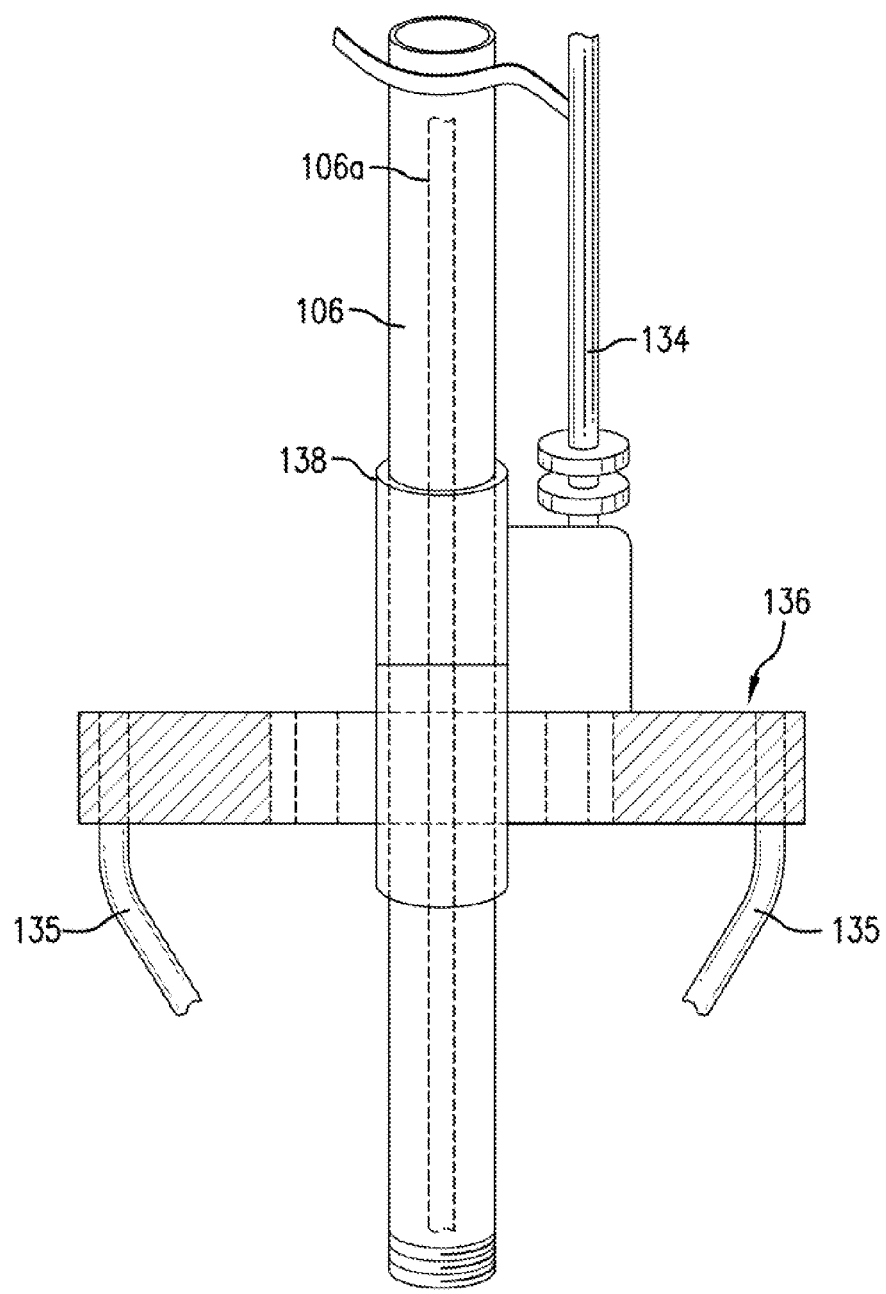
FIG. 3A is a close-up view of a sleeve and bearing system to prevent entanglement of a furling cable.
Figure 3B:
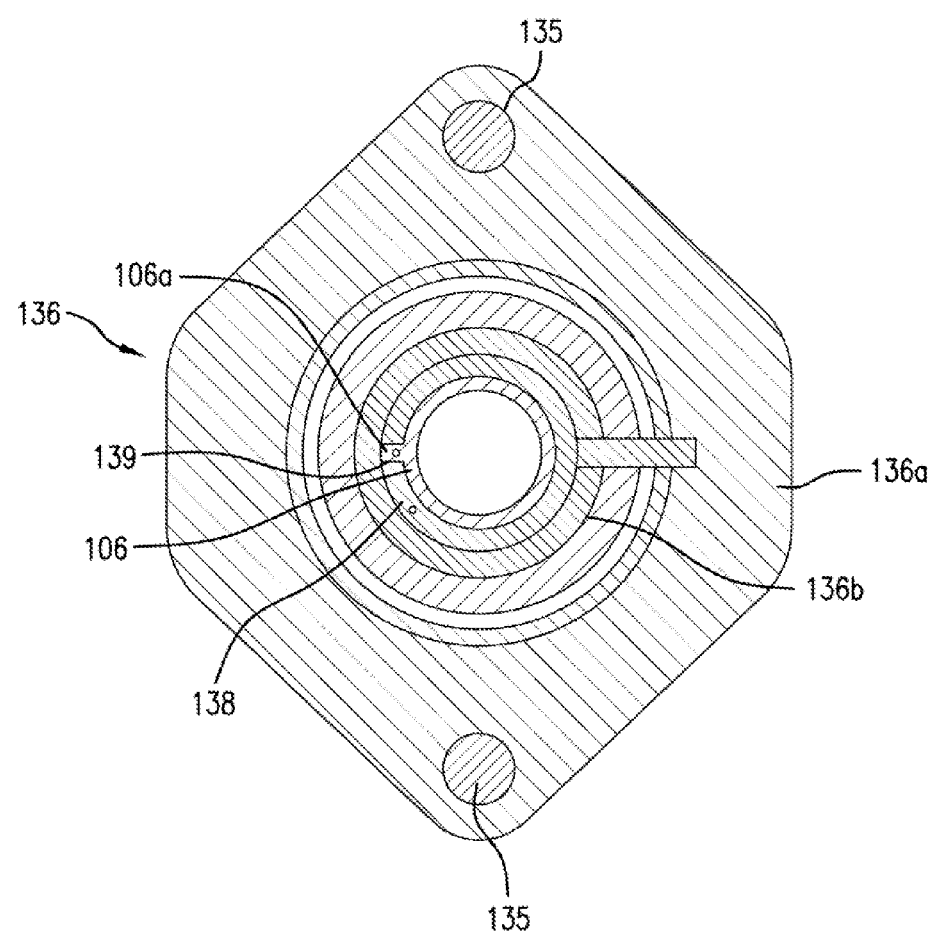
FIG. 3B is a cut-away view of the bearing system of FIG. 3A.

A cable 134 for furling propeller section 110 out of the wind extends from tail section 112 to the ground. Referring to FIGS. 2C and 2D, cable 134 is connected to tail section 112 at the end of a horizontal quarter pulley 133. Cable 134 extends horizontally around horizontal quarter pulley 133 and is directed downward toward the ground, by a directional pulley 137 where it extends through a hole 141 next to conduit 106 and travels downward to a sleeve 138 positioned around conduit 106. The arrangement of horizontal quarter pulley 133 and directional pulley 137 translates axial motion from movement of cable 134 to rotational movement of one of the respective sections 110 and 112 with respect to each other.

Sleeve 138 includes a slot 139 and is keyed to conduit 106 by engagement of slot 139 with a bar 106a of rectangular cross-section welded to the side of conduit 106. Thus, sleeve 138 can move upward and downward with respect to conduit 106 while being maintained in the same angular orientation with respect to conduit 106. Sleeve 138 is also connected to a bearing swivel 136. Here, the connection is made by an interference fit between sleeve 138 and bearing swivel 136. Bearing swivel 136 has a body 136a surrounding a bearing cage 136b, which bearing cage 136b engages sleeve 138 so that sleeve 138 rotates with respect to body 136a. A second cable 135 is attached to the underside of body 136a of bearing sleeve 136 and extends down toward the ground in a generally non-rotational state where it attaches to a lever 140 (see FIG. 1).

Lever 140 is operable both manually and automatically to furl propeller section 110. For manual operation, a user can pull lever 140 downward to furl propeller section to the inactive position. Lever 140 is arranged to provide sufficient pull to cable 135 to move propeller section 110 the entire pivotal distance between the active mode and the inactive mode. Lever 140 can be provided with a lockout to retain it in the furled/inactive position, for instance, when there is no demand for compressed air or maintenance is being performed on the air tank, etc. For automated operation, an actuator 142 is connected to lever 140 and can move lever 140 in response to a signal from a pressure sensor 144 on tank 108. For instance, when the pressure in tank 108 reaches a predetermined threshold, a signal is sent to activate actuator 142 and move lever 140 to furl propeller section 110 to the inactive position.

In the illustrated embodiment, a hose 145 extends between pressure sensor 144 and actuator 142. Compressed air in excess of predetermined threshold is channeled through hose 145 to actuator 142 to cause it to actuate and furl propeller section 110 to the inactive position. For purposes of this disclosure, the active position can be any position in which propeller 111 is being driven by the wind and the inactive position can be any position in which the propeller 111 is angled away from head-on to the wind. In the illustrated embodiment, the propeller is generally head-on to the wind in the active position and near perpendicular or generally perpendicular to the wind in the inactive position. However, even an angle that is not close to perpendicular to the wind may remove sufficient driving force from the wind on the propeller to effectively make the propeller inactive.

Figure 5:
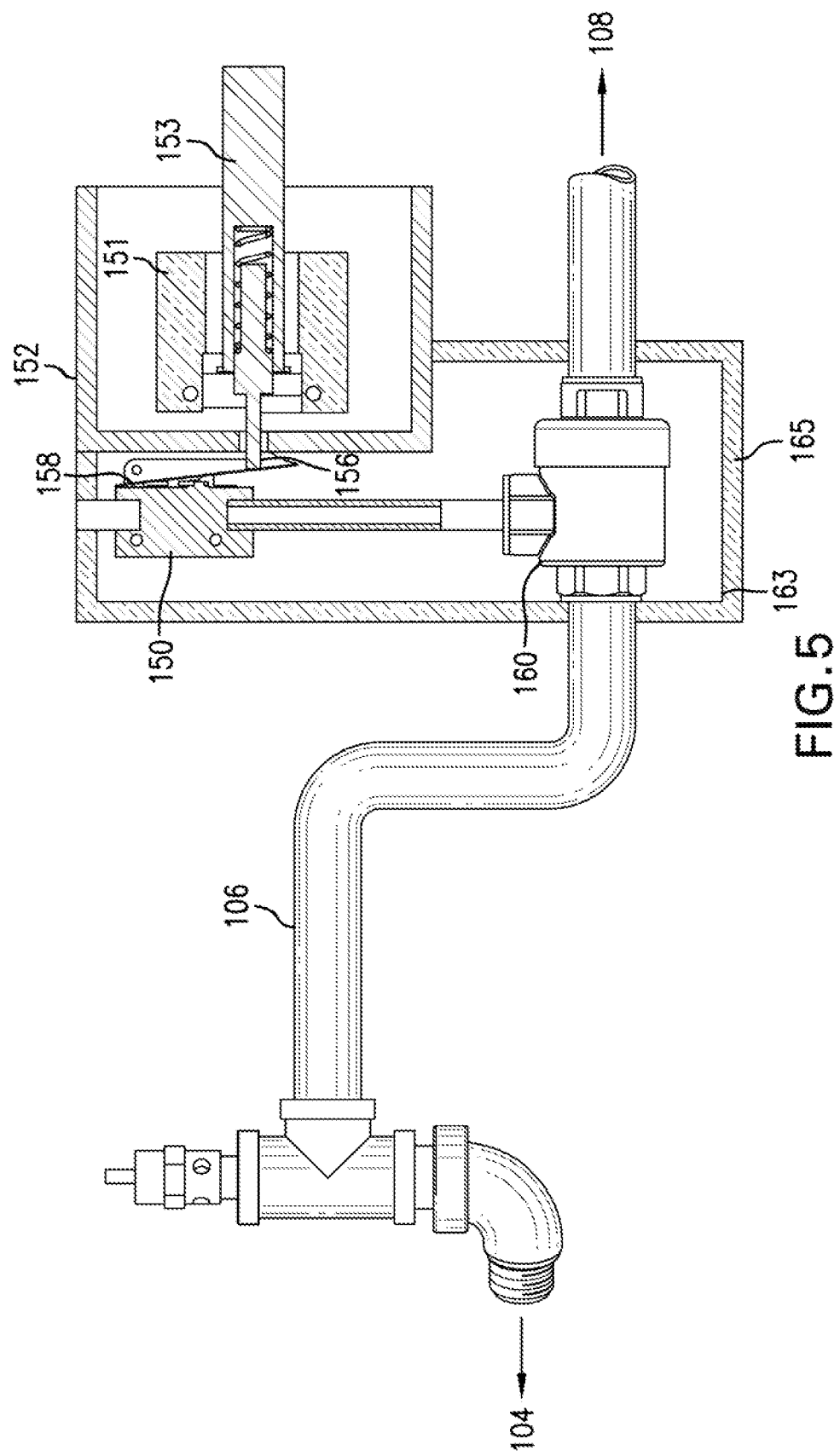
FIG. 5 is a schematic for the wind driven compressor, specifically illustrating a pressure relief valve for releasing head pressure.

FIG. 5 shows a schematic of a relief valve 150 for releasing head pressure on the compressor 104 when the RPM of rotating shaft 118 drops below a predetermined threshold. A centrifugal actuator 152 has a shaft 153 rotationally connected to rotating shaft 118, which, as shown here, can be by a belt engaging respective pulleys 151a and 151b. A plunger 156 is retracted by pivoting counterweights 151 when rotating shaft 118 is rotating above the predetermined threshold. As the speed of rotating shaft 118 begins to decrease, pivoting counterweights 151 are exposed to less centrifugal force and begin to retract to extend plunger 156 outward to engage a microswitch 158. In the preferred embodiment, microswitch 158 is engaged at a turbine speed of approximately 80 RPM, however, the speed can be changed by changing the size of pulley 151a or adjusting the centrifugal actuator 152. In an alternative embodiment, another type of speed sensing actuator can be used other than centrifugal actuator 152.

When plunger 156 engages microswitch 158, microswitch 158 opens relief valve 150. This can also simultaneously close a check valve 160 in line between compressor 104 and storage tank 108. With check valve 160 closed, head pressure from the compressor is released by directing the air from the compressor 104 through relief valve 150 to the atmosphere. This arrangement prevents compressor 104 from stalling when rotational speed of rotating shaft 118 decreases below a predetermined threshold. Compressor 104 can still be rotating under such a condition but because the air from the compressor 104 is being discharged to the atmosphere and not being compressed to any substantial pressure, compressor 104 thus operates under a low load or no load condition in low wind conditions, and can start-up as the wind begins to increase from no-wind conditions.

Microswitch 158 is susceptible to failure, or being rendered inoperable, in cold weather conditions, primarily from frozen moisture from condensed air. Failure/inoperability can occur when microswitch 158 is stuck in the open position by the frozen moisture and compressed air is directed to the atmosphere, rather than storage tank 108. To reduce the likelihood of failure or inoperability, an environment surrounding the microswitch 158 is created in which heat from the pressurized air moving through conduit 106 is absorbed and retained within the environment. A shield 163 is positioned to at least partially enclose microswitch 158 and check valve 160, and this shield 163 is then surrounded by a layer of insulation 165, thereby forming the environment for retaining heat from pressurized air traveling through conduit 106. Alternatively, shield 163 may be omitted in favor of use of just insulation 165. Microswitch 158 is also preferably positioned within an inch or less from check valve 160; however, a distance of 4 inches or more from conduit 106 is acceptable depending on the quality of the insulation, the temperature of the compressed air inside conduit 106, and the outside air temperature.

In this manner, moisture is substantially eliminated by the high temperatures of the compressed air traveling in conduit 106, which can reach temperatures of several hundred degrees Fahrenheit. The heat evaporates moisture in the lines and any moisture that has condensed around microswitch 158. By the time the heat retained in the environment has dissipated and the temperature inside the environment has dropped below freezing, any moisture surrounding microswitch 158 has likely evaporated, thus reducing the likelihood of failure/inoperability of microswitch 158.

Figure 4A:
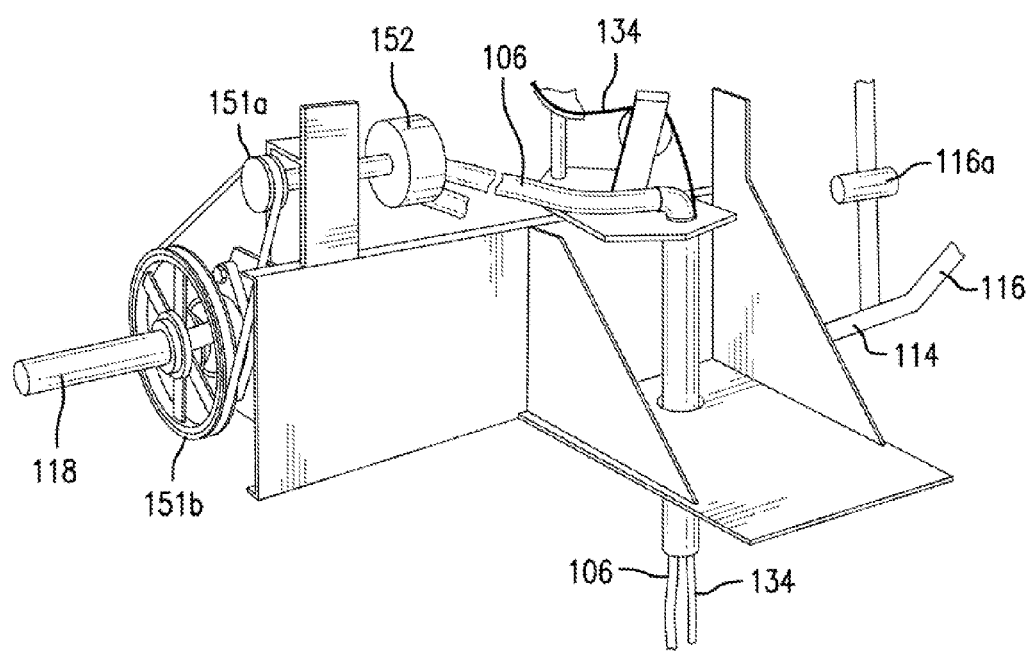
FIG. 4A is a close-up view of a frame, on which is mounted the wind driven compressor.
Figure 4B:
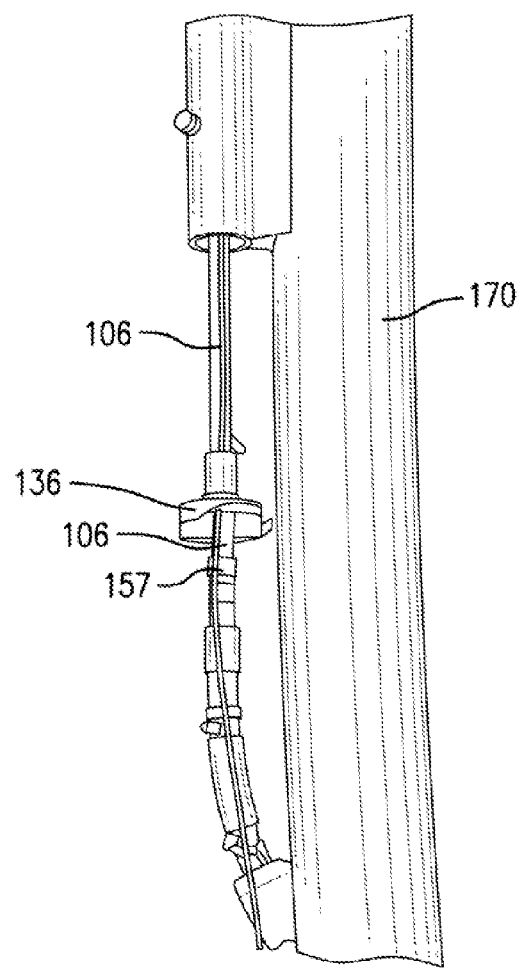
FIG. 4B is a close-up view of the tower of FIG. 1A illustrating the point of entry for the conduit.

Conduit 106 transmits compressed air from compressor 104 to the ground where storage container 108 is positioned. To compensate further for cold weather conditions, conduit 106 is channeled gradually into a tower 170 to prevent collection of condensation that can freeze and break loose, blocking conduit 106. Referring to FIG. 4B, conduit 106 extends through bearing swivel 136 to a coupler 157 that connects an upper portion of conduit 106 that rotates with one of the respective sections 110 and 112 to a lower portion of conduit 106 that is rotationally fixed. Conduit 106 gradually tapers into a tower 170 to allow frozen condensation to fall to the bottom and not obstruct the air flow. The length of conduit 106 between the top of windmill 10 and the ground acts as a condenser to condense moisture in the compressed air. The condensed moisture can be released from the conduit 106 through a release valve 172 positioned near the ground.

Windmill 10 is mounted on top of tower 170, which can be raised and lowered. Tower 170 can have a 6 foot T-shaped bottom (not shown) mounted on two concrete foundations to allow swiveling when raising and lowering. A winch (not shown) mounted on H-beams in concrete can automatically raise and lower tower 170.

One skilled in the art will recognize that other variations of the illustrated embodiment are contemplated herein. For example, windmill 10 can be a prime mover to drive other types of devices, such as a refrigeration gas compressor, a generator, an alternator, a permanent magnet alternator and a water, fluid or other type of pump.

While the present invention has been particularly shown and described with reference to exemplary embodiments thereof, it should be understood by those of ordinary skill in the art that various changes, substitutions and alterations could be made herein without departing from the scope of the invention as defined by appended claims and their equivalents. It is intended that various aspects of various embodiments can be combined in new combinations to create new embodiments within the scope of the invention. The invention can be better understood by reference to the following claims. For purpose of claim interpretation, the transitional phrases "including" and "having" are intended to be synonymous with the transitional phrase "comprising."

What is claimed is:

1. An automated furling system for a wind driven compressor, the system comprising:
    a wind driven compressor having a propeller section, a tail section hinged to the propeller section, an air compressor rotationally combined to the propeller section, and a storage tank in fluid communication with the air compressor for storing a compressed air therein;
    a pressure sensor associated with the storage tank for sensing a predetermined pressure inside the storage tank;
    an actuator for actuating in response to a signal from the pressure sensor that the pressure sensor has sensed the predetermined air pressure in the storage tank;
    a linkage system extending between the actuator and one of the propeller section and the tail section to move one of the respective sections between an active position where the compressor is compressing and an inactive position where the compressor is inactive; and
    wherein the linkage system rotates with one of the respective sections around an axis of a channel that provides for fluid communication between the air compressor and the storage tank to maintain an alignment of the linkage system and the linkage system moves axially between the active and the inactive position.

2. The automated furling system of claim 1, wherein the active position includes the propeller section and the tail section generally aligned with each other and the inactive position includes the respective sections generally unaligned with each other.

3. The automated furling system of claim 2, wherein the active position includes the propeller section and the tail section generally aligned 180 degrees with each other and the inactive position includes the respective sections generally perpendicular with respect to each other.

4. The automated furling system of claim 3, wherein the channel includes a pipe that extends perpendicular with respect to a ground surface between the air compressor and the storage tank, wherein the pipe establishes the fluid communication of the compressed air therebetween.

5. The automated furling system of claim 4, wherein the linkage system includes a bearing swivel combined to the pipe to rotate around the pipe and move axially with respect to the pipe.

6. The automated furling system of claim 5, wherein the pressure sensor is a pressure relief valve having an output that is in fluid communication with the actuator, wherein a portion of the compressed air inside the storage tank is released through the output of the pressure relief valve to the actuator.

7. The automated furling system of claim 6, wherein the linkage system includes a lever engageable by the actuator to move the lever between an active and an inactive position, which corresponds to the respective positions for the linkage system and the wind driven compressor.

8. The automated furling system of claim 7, and further comprising a biasing member positioned between the propeller section and the tail section to bias the propeller section and the tail section in the active position, wherein an external force asserted against one of the respective sections urges such section toward the inactive position to decrease a rotational speed of the propeller section.

9. An automated furling system for a wind driven machine, the system comprising:
- a wind mill having a propeller section, a tail section hinged to the propeller section, and the wind driven machine rotationally combined to the propeller section;
- a machine sensor associated with the wind driven machine for sensing a predetermined condition for the wind driven machine;
- an actuator for actuating in response to a signal from the machine sensor that the machine sensor has sensed the predetermined condition of the wind driven machine;
- a linkage system extending between the actuator and one of the propeller section and the tail section to move of the respective sections between an active position where the wind driven machine is active and an inactive position where the wind driven machine is inactive;
- wherein the linkage system includes a first portion that rotates with one of the respective sections to maintain an alignment of the linkage system and a second portion that is generally rotationally fixed with respect to the first portion and moves axially between an active and an inactive position corresponding to the active and inactive positions of the wind driven machine;
- a channel that includes a pipe that extends perpendicular with respect to the ground surface, wherein the pipe establishes a fluid communication of a compressed fluid between the wind driven machine and a storage tank; and
- a bearing swivel combined to the pipe, the bearing swivel having an inner portion and an outer portion, the inner portion rotates with respect to the outer portion, the inner portion having an interference fit with the pipe so the inner portion and the pipe rotate with respect to the outer portion, and wherein the bearing swivel moves axially with respect to the pipe.

10. The automated furling system of claim 9, wherein the wind driven machine is one of an air compressor, refrigeration gas compressor, and a pump.

11. The automated furling system of claim 10, wherein the wind driven machine is an air compressor in fluid communication with the storage tank and the machine sensor is a pressure sensor.

12. The automated furling system of claim 11, wherein the active position for the wind driven machine includes the propeller section and the tail section generally aligned with each other and the inactive position for the wind driven machine includes the respective sections generally unaligned with each other.

13. The automated furling system of claim 12, wherein the active position for the wind driven machine includes the propeller section and the tail section generally aligned 180 degrees with each other and the inactive position for the wind driven machine includes the respective sections generally perpendicular with respect to each other.

14. The automated furling system of claim 9, wherein the machine sensor is a pressure relief valve having an output that is in fluid communication with the actuator, wherein a portion of the compressed fluid inside the storage tank is released through the output of the pressure relief valve to the actuator.

15. The automated furling system of claim 14, wherein the second portion of the linkage system includes a lever engageable by the actuator to move the lever between an active and an inactive position, which corresponds to the respective positions for the linkage system and the wind driven machine.

16. The automated furling system of claim 15, and further comprising a biasing member positioned between the propeller section and the tail section to bias the propeller section and the tail section in the active position, wherein an external force asserted against one of the respective sections urges such section toward the inactive position to decrease a rotational speed of the propeller section.

17. A wind driven machine, comprising:
- a propeller section for converting a wind energy from a wind into rotational motion;
- a tail section attached to the propeller section to direct the propeller section into the wind, the tail section hingedly attached to the propeller section;
- a fluid compressor selectively engageable with the propeller section for using the rotational motion of the propeller section to pressurize fluid, and;
- a furling mechanism to move one of the propeller section and the tail section between an inactive position where the fluid compressor is in an inactive mode of operation in response to a predetermined condition and an active position where the fluid compressor is in an active mode of operation, wherein a first portion of the furling mechanism rotates with one of the respective sections to maintain an alignment of the furling mechanism and a second portion that is generally rotationally fixed and moves axially between an active and an inactive position corresponding to the active and inactive positions of the wind driven machine,
- a channel that includes a pipe that extends perpendicular with respect to a ground surface, wherein the pipe establishes a fluid communication of the compressed fluid between the fluid compressor and a storage tank; and
- wherein the linkage system includes a bearing swivel combined to the pipe, the bearing swivel having an inner portion and an outer portion, the inner portion rotates with respect to the outer portion, the inner portion having an interference fit with the pipe so the inner portion and the pipe rotate with respect to the outer portion, and wherein the bearing swivel moves axially with respect to the pipe.

18. The wind driven machine of claim 17, wherein the storage tank further comprises a sensor for sensing a predetermined level of a stored energy in the storage tank and responding with a signal to an actuator when the storage tank reaches the predetermined level, the actuator being attached to the second portion of the furling mechanism to actuate the second portion to cause rotational movement of one of the propeller section and the tail section with respect to each other to the inactive position, the furling mechanism further including a biasing member positioned between the propeller section and the tail section to provide a biasing force urging at least one of the propeller section and the tail section toward the active position, which biasing force can be counteracted by a force of the wind when the wind speed increases above a predetermined level.

19. An automated furling system for an air compressor, the system comprising:
   a wind mill having a propeller section, a tail section hinged to the propeller section, and the air compressor rotationally combined to the propeller section;
   a pressure relief valve associated with the air compressor for sensing a predetermined condition for the air compressor;
   an actuator for actuating in response to a signal from the pressure relief valve that the pressure relief valve has sensed the predetermined condition of the air compressor, the pressure relief valve having an output that is in fluid communication with the actuator;
   a linkage system extending between the actuator and one of the propeller section and the tail section to move of the respective sections between an active position where the air compressor is active and an inactive position where the air compressor is inactive;
   wherein the linkage system includes a first portion that rotates with one of the respective sections to maintain an alignment of the linkage system and a second portion that is generally rotationally fixed with respect to the first portion and moves axially between an active and an inactive position corresponding to the active and inactive positions of the air compressor; and
   a storage tank, wherein a portion of a compressed air inside the storage tank is released through the output of the pressure relief valve to the actuator.

20. The automated furling system of claim 19, wherein the active position for the air compressor includes the propeller section and the tail section generally aligned with each other and the inactive position for the air compressor includes the respective sections generally unaligned with each other.

21. The automated furling system of claim 20, wherein the active position for the air compressor includes the propeller section and the tail section generally aligned 180 degrees with each other and the inactive position for the air compressor includes the respective sections generally perpendicular with respect to each other.

22. The automated furling system of claim 21, and further including a channel that includes a pipe that extends perpendicular with respect to a ground surface, wherein the pipe establishes a fluid communication of a compressed air between the air compressor and the storage tank.

23. The automated furling system of claim 22, wherein the linkage system includes a bearing swivel combined to the pipe, the bearing swivel having an inner portion and an outer portion, the inner portion rotates with respect to the outer portion, the inner portion having an interference fit with the pipe so the inner portion and the pipe rotate with respect to the outer portion, and wherein the bearing swivel moves axially with respect to the pipe.

24. The automated furling system of claim 23, wherein the second portion of the linkage system includes a lever engageable by the actuator to move the lever between an active and an inactive position, which corresponds to the respective positions for the linkage system and the air compressor.

25. The automated furling system of claim 24, and further comprising a biasing member positioned between the propeller section and the tail section to bias the propeller section and the tail section in the active position, wherein an external force asserted against one of the respective sections urges such section toward the inactive position to decrease a rotational speed of the propeller section.

* * * * *